(12) United States Patent
Kassinen et al.

(10) Patent No.: US 6,236,651 B1
(45) Date of Patent: May 22, 2001

(54) BASE STATION

(75) Inventors: Juha Kassinen; Paavo Pökkä, both of Oulu (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/214,411

(22) PCT Filed: Apr. 29, 1998

(86) PCT No.: PCT/FI98/00373

§ 371 Date: Dec. 28, 1998

§ 102(e) Date: Dec. 28, 1998

(87) PCT Pub. No.: WO98/49839

PCT Pub. Date: Nov. 5, 1998

(30) Foreign Application Priority Data

Apr. 29, 1997 (FI) ................................................ 971829 U

(51) Int. Cl.[7] ........................... H04B 7/212; H04Q 7/00
(52) U.S. Cl. .......................... 370/347; 370/321; 370/330; 370/442; 370/334
(58) Field of Search ................................. 370/331, 321, 370/324, 337, 347, 442; 455/440, 73, 33.4, 422, 561, 426, 517

(56) References Cited

U.S. PATENT DOCUMENTS 5,544,171    8/1996   Godecker .
5,615,215  * 3/1997   Utting et al. ........................ 370/337
5,668,804  * 9/1997   Suonvieri .............................. 370/331
5,740,166  * 4/1998   Ekemark et al. ..................... 370/331
5,825,764  * 10/1998  Rudolph ................................ 370/337
5,839,071  * 11/1998  Johnson ................................ 455/440

FOREIGN PATENT DOCUMENTS 687 079 A2   12/1995   (EP) .
738 052 A2   10/1996   (EP) .
95/02306     1/1995    (WO) .
95/08896     3/1995    (WO) .
97/01254     1/1997    (WO) .

* cited by examiner

Primary Examiner—Hassaan Kizou
Assistant Examiner—Hanh Nguyen
(74) Attorney, Agent, or Firm—Pillsbury & Winthrop

(57) ABSTRACT

The invention relates to a data transmission method and a base station for a TDMA radio system, the base station comprising at least two tranceivers (300, 304) adapted to communicate with terminals within the base station area, the base station being adapted to transmit information concerning itself to the terminals, and the transceivers being adapted to communicate with the terminals within service areas that are at least partly different so as to form an inner (202) and an outer (204) service area. To enable an advantageous implementation of a cell, only the transceiver (304) serving the outer service area is adapted to transmit information concerning the base station.

13 Claims, 3 Drawing Sheets

1

BASE STATION

FIELD OF THE INVENTION

The invention relates to a base station for a TDMA radio system in which, the base station includes at least two transceivers adapted to communicate with terminals within the base station area. The base station being adapted to transmit information concerning itself to the terminals and the transceivers are adapted to communicate with the terminals within service areas that are at least partly different to form an inner and an outer service area.

Description of the Related Art

In digital Time Division Multiple Access (TDMA) radio systems, a plurality of mobile radio stations may utilize the same radio channel on a time division basis for communication with the base station. Communication on the radio channel takes place in a number of successive repeated timeslots, e.g., 8 time slots, allocated to the users as required. A mobile radio station is synchronized with a signal from the base station, and transmits to the base station so that the signal is received at the mobile station in a timeslot allocated to this particular mobile station. Mobile stations, however, may be located at different distances from the base station, whereby the propagation delay caused by this distance has to be taken into account in the synchronization of the time of transmission of each mobile station with the base station so that the signal will be received at the base station in the right timeslot. For this purpose, the base station measures the time difference between its own transmission and the transmission received from the mobile station station based on which it defines a suitable timing advance for the mobile station. The mobile station uses this timing advance to advance the time of its transmission relative to a basic time instant defined by the sync received from the base station. Various intrasystem features limit the highest possible timing advance to a given maximum value. This maximum value of the timing advance, in turn, dictates the maximum cell size that the base station of the system is able to serve. In the GSM mobile telephone system (Global System for Mobile Communication), for example, the timing advance is expressed by using six bits and can be given values from 0 to 63, which means a cell size with a maximum radius of 35 km. However, such a cell size of 35 km may be too small in, e.g., sparsely populated areas with a low traffic load.

To increase cell size, an "extended cell" has been developed, whereby a cell is divided into several, e.g., two, parts; an inner and outer service area. In this case, the base station serving the cell comprises two transceivers, each of which serve terminals within its own service area. Problems caused by the different propagation delays of the different service areas are solved by delaying the reception frame structure of the transceiver serving the outer service area. Some examples of such extended cells are described in, e.g., patent publications WO 9502306 and WO 9508896.

A problem in extended cells is transmission of base station broadcast channels. In a typical radio system the base station has to transmit information concerning itself to the terminals, and the terminals use this information to identify the base station and to be able, when needed, to transmit a call setup request to the base station. In the GSM system, for example, the base stations transmit the BCCH channel. FIG. 1 illustrates a prior art manner of transmitting the BCCH channel in an extended cell. FIG. 1 shows transmission and reception frames 100 and 102 of a transceiver (TRX1) serving an inner service area, and transmission and reception frames 104 and 106 of a transceiver (TRX2) serving an outer service area. In transmitting traffic channels, the TRX1 uses a given frequency channel X which comprises specific physical frequency bands for the different transmission directions. In transmitting traffic channels, the TRX2 uses a given frequency channel Y which comprises specific physical frequency bands for the different transmission directions. In the example of the figure the frames comprise 8 timeslots, numbered from 0 to 7. However, on the reception side the time slot numbering is different in that a certain time slot number appears three timeslots later than the corresponding timeslot number on the transmission side. The BCCH channel is transmitted in the first timeslot of the frame 100 of the transceiver serving the inner service area. The terminals transmit their call set-up bursts in a corresponding timeslot of the other transmission direction. The first timeslot of the reception frame 106 of the transceiver TRX2 serving the outer area is also reserved for call set-up bursts originating from the outer area, and this timeslot uses the frequency X. In both transmission directions the second timeslot of the transceiver TRX1 serving the inner service area has to be left unused in order not to interfere with a call set-up request from the outer area to the TRX2. The first timeslot in the transmission direction frame 104 of the transceiver TRX2 serving the outer service area is not in use because the BCCH is transmitted via the TRX1 and because the reception of the same timeslot is reserved for call set-up of the outer area.

The drawback in the above arrangement is that the transmission of the transceiver serving the inner service area has to be audible in the outer service area, too. For this reason the antennas of both transceivers have to have a narrow beam or be highly amplifying and located high up in the antenna mast. The transmission power has also to be maximized to both transmission antennas. This makes it costly to implement an extended cell.

BRIEF DESCRIPTION OF THE INVENTION

It is an object of the invention to eliminate the above problem. This is achieved by a base station having at least to translators adapted to communicate with a plurality of terminals within the base station area, wherein the base station is adapted to transmit information concerning itself to the plurality of terminals wherein the transceivers are adapted to communicate with the plurality of terminals within at least two service areas that are at least partly different to form an inner and an outer service area, and wherein the transceiver serving the outer service area is adapted to transmit information concerning the base station.

The invention also relates to a data transmission method for a TDMA radio system that includes a plurality of base stations communicating with terminals within their area, and at least two transceivers being used in the base stations to form at least two service areas which are at least partly different so as to form an inner and an outer service area, wherein each transceiver serves one service area, and the base station transmits information concerning itself to the terminals. In this method of the instant invention, only the transceiver serving the outer service area transmits information concerning the base station to the terminals.

The method and system of the invention provide many advantages. The antennas/antenna lines of only one transceiver have to be optimized in order for the audibility to cover the outer service area. This allows an extended cell to be implemented significantly more inexpensively than before.

BRIEF DESCRIPTION OF THE FIGURES

In the following the invention will be described by means of preferred embodiments with reference to the attached drawings, in which.

DETAILED DESCRIPTION OF THE PRESENTLY PREFERRED EMBODIMENTS OF THE INVENTION

The present invention is intended to be implemented in an extended cell of any TDMA radio network employing a Timing Advance to shift the time of transmission of a mobile radio station relative to a time instant set by a synchronization signal transmitted by a base station so that the timing advance compensates for the transmission delay caused by the distance between the base station and the mobile station, and the transmission of the mobile station is received at the base station in the correct TDMA timeslot. The invention is particularly suitable for use in the GSM and DCS1800 mobile telephone systems. The invention will be described in association with, but not restricted to, the GSM system.

Figure 1:
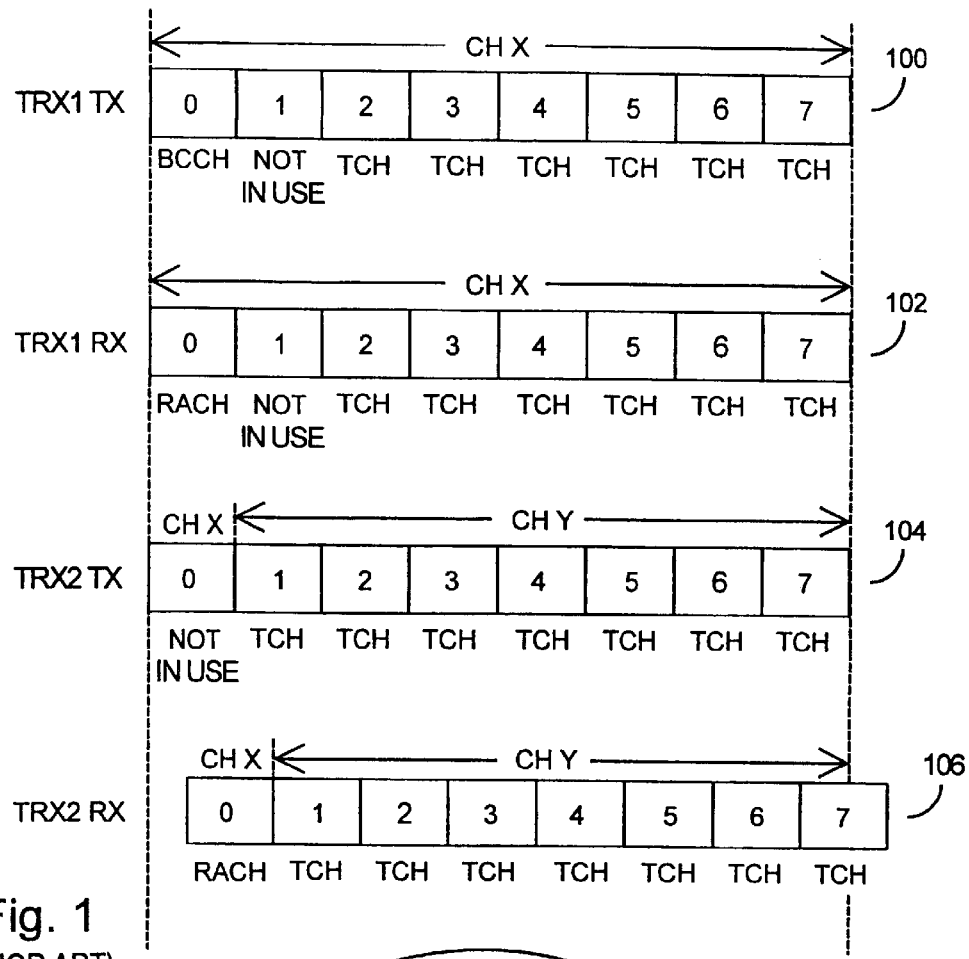
FIG. 1 shows a prior art solution described above.
Figure 2:
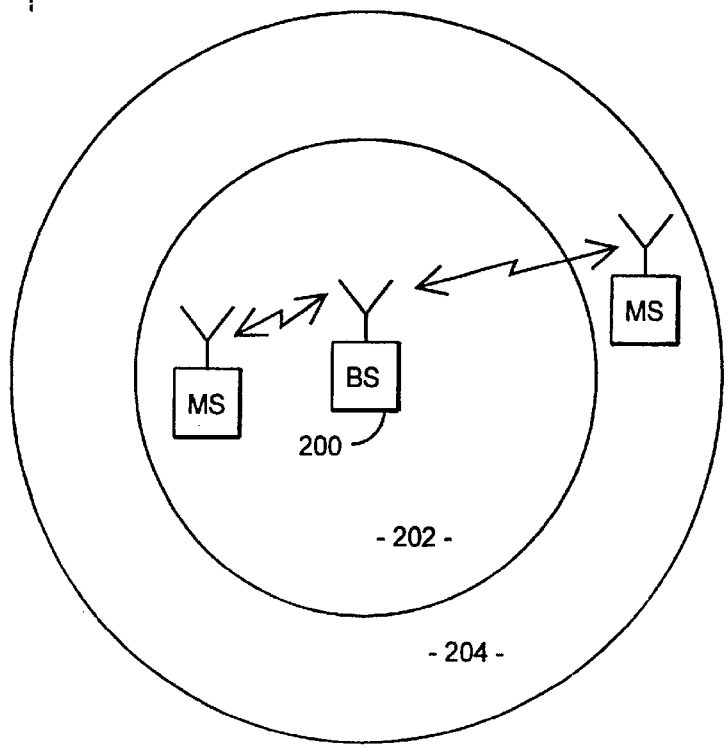
FIG. 2 illustrates an extended cell and its service areas.

FIG. 2 shows an extended cell having a base station 200 whose coverage area has two parts, an inner service area 202 and an outer service area 204. The inner service area is a service area implemented conventionally, i.e., its radius is within a conventional timing advance. The outer service area is achieved by delaying the frame structure of the transmission direction serving the service area.

Figure 3:
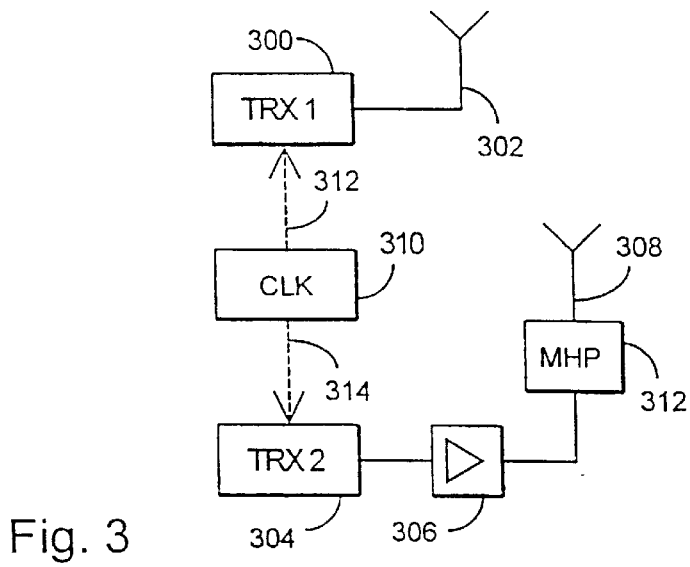
FIG. 3 shows the structure of the base station of the invention.

The structure of the base station of the invention is shown in FIG. 3. Referring to the base station, only parts and functions of the base station essential to the understanding of the invention are described. In the example of FIG. 3, the base station includes a first transceiver 300, first antenna units 302, a second transceiver 304, an amplifier 306, a mast preamplifier 312, second antenna units 308, and a clock 310. With reference to FIG. 2, the first transceiver 300 serves the inner service area 202 and the second transceiver 304 the outer service area 204.

Figure 4:
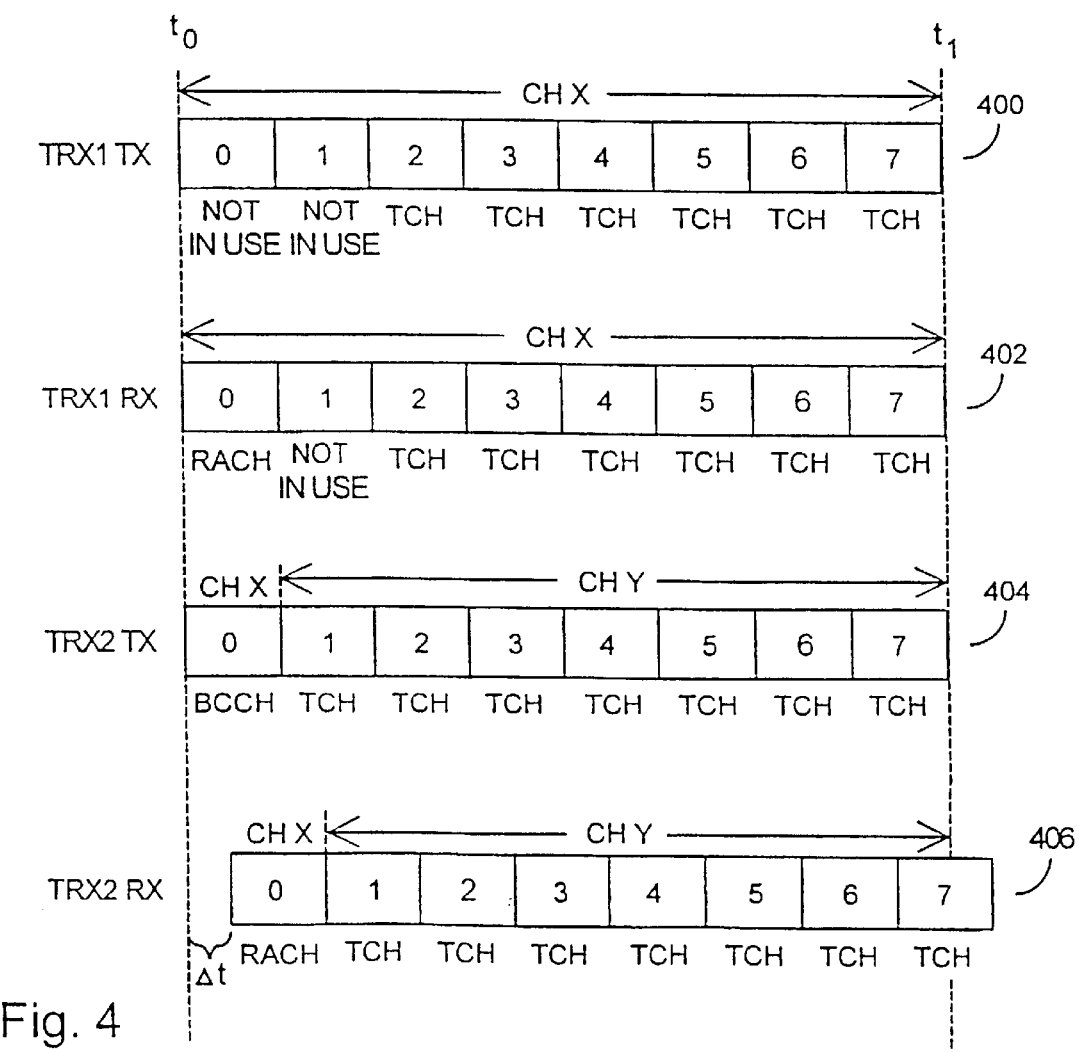
FIGS. 4 and 5 illustrate frame structures of the invention.

The clock 310 of the base station generates clock signals 312, 314 for the transceivers. FIG. 4 illustrates the frame structures of the invention. The figure shows transmission and reception frames 400 and 402 of a transceiver TRX1 300 serving the inner service area, and transmission and reception frames 404 and 406 of a transceiver TRX2 304 serving the outer service area. In transmitting traffic channels, the TRX1 uses a given frequency band X, which comprises specific physical frequency bands for the different transmission directions. In transmitting traffic channels, the TRX2 uses a given frequency band Y, which comprises specific physical frequency bands for the different transmission directions. With reference to FIG. 4, the TDMA frame cycle of the first transceiver 300 begins at a time $t_0$, when the first timeslot of the frame also begins. The following timeslots of the frame begin at times determined by the clock pulses 312, until a new frame again begins at a time $t_1$. In this specific case, one frame comprises 8 timeslots, but the number of timeslots may be higher or lower, e.g., 4, depending on the system. In FIG. 4, the timeslots are numbered from 0 to 7. However, on the reception side timeslot numberings differ in that a certain time slot number occurs three timeslots later than the corresponding timeslot number on the transmission side.

Similarly, the TDMA frame cycle of the second transceiver 304 begins at a time $t_0$, when the first timeslot of the frame also begins. The following timeslots of the frame begin at times determined by the clock pulses 314, until a new frame again begins at a time $t_1$. Since the second transceiver 304 serves the outer service area 204, the frame is delayed by a delay $\Delta t$ in the reception direction because of the longer propagation delay.

In the instant invention the base station transceiver serving the outer service area is adapted to transmit information concerning the base station. The BCCH channel is transmitted in the first timeslot of the frame 404 of the transceiver serving the outer service area. The frequency channel X is used for this transmission. Similarly, in the time slot of the second transmission direction, both the outer and inner transceivers are adapted to receive on the frequency channel X the call set-up bursts transmitted by the terminals. The second timeslot in the reception direction frame 402 of the transceiver TRX1 serving the inner service area is not in use in order not to interfere with a call set-up request from the outer area to TRX2 in the frame 406. The first and second timeslots of the transmission direction frame 400 of the transceiver serving the inner service area are not used either.

Figure 5:
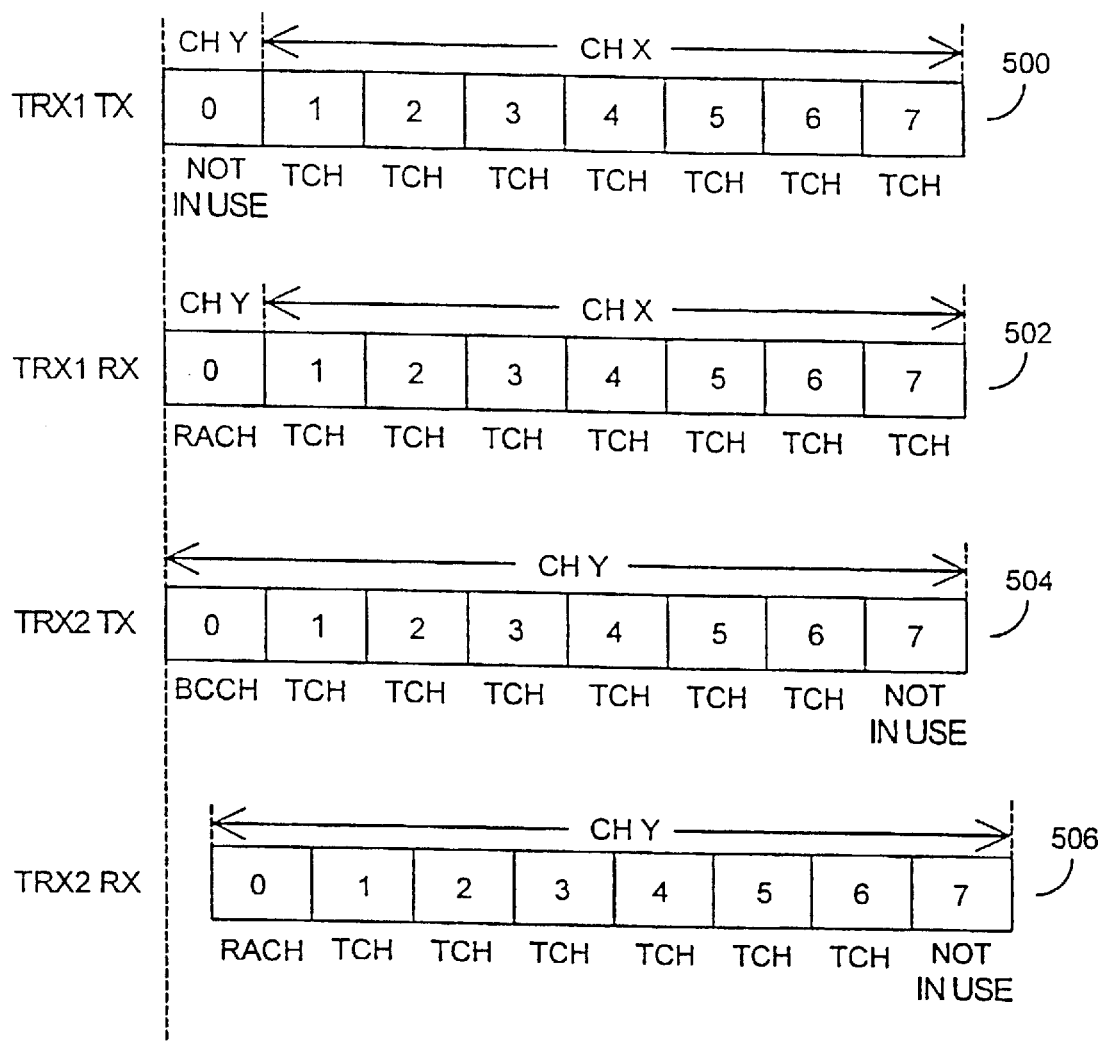

In another preferred embodiment of the invention. As shown in FIG. 5, the clock 310 of the base station generates the clock signals 312, 314 for the transceivers. The figure shows transmission and reception frames 500 and 502 of the transceiver TRX1 serving the inner service area, and the transmission and reception frames 504 and 506 of the transceiver TRX2 serving the outer service area. As before, in transmitting traffic channels, the TRX1 uses the given frequency channel X, which comprises specific physical frequency bands for the different transmission directions. In transmitting traffic channels, the TRX2 uses the given frequency channel Y, which comprises specific physical frequency bands for the different transmission directions. The timing of the TDMA frame cycles of the first and second transceivers 300, 302 are identical to those in the above example, i.e., the reception direction frame of the second transceiver 304 is delayed.

In the instant invention the base station transceiver serving the outer service area is adapted to transmit information concerning the base station. The BCCH channel is transmitted in the first timeslot of the frame 504 of the transceiver serving the outer service area. This timeslot is transmitted on the frequency channel Y. In a corresponding timeslot of the other transmission direction both the outer and inner transceivers are also adapted to receive call set-up bursts transmitted by the terminals on frequency Y. The first timeslot of the frame 500 of the transceiver serving the inner area is not in use. Furthermore, the last timeslot in the transmission and reception direction frames 504, 506 of the transceiver TRX2 serving the outer service area are not in use in order not to interfere with call set-up requests in the first timeslot from the transceiver TRX1 serving the inner service area.

The structures of the transceivers serving the outer and inner service areas are implemented by prior art technology. However, the operation of the devices is adapted in accordance with the invention as described above.

The instant invention makes it possible that only one transceiver has to cover the outer service area. For this reason, the antenna means or antenna 302 coupled to the first transceiver 300 can be placed low, and no high-power, directive antennas are needed. Only the antenna means or antenna 308 coupled to the second transceiver 304 require both high amplification in the amplifier 306, a mast preamplifier 312 in the reception direction, and, depending on the implementation, a high directivity and a location high up. This results in considerable savings when building a cell.

Although the invention has been described above with reference to the example according to the attached drawings, it is evident that the invention is not restricted thereto, but can be modified in a variety of ways within the scope of the inventive idea disclosed in the attached claims.

What is claimed is:

1. A base station for a TDMA radio system, the base station comprising:
   at least two transceivers adapted to communicate with a plurality of terminals within a base station area,
   wherein the base station is adapted to transmit information concerning itself to the plurality of terminals,
   wherein the transceivers are adapted to communicate with the plurality of terminals within at least two service areas that are at least partly different to form an inner service area and an outer service area, and
   wherein only the transceiver serving the outer service area is adapted to transmit information concerning the base station.

2. The base station as claimed in claim 1, wherein the timing of the reception of the transceiver serving the outer service area is delayed in order to compensate for the effect of the propagation delay.

3. The base station as claimed in claim 1, wherein the transceiver serving the outer service area is adapted to transmit information concerning the base station in a predetermined timeslot.

4. The base station as claimed in claim 3, wherein the transceiver serving the outer service area is adapted to receive a call set-up burst transmitted by a terminal in the same timeslot of a reverse transmission direction as in which information concerning the base station is transmitted.

5. The base station as claimed in claim 3, wherein the transceiver serving the inner service area is adapted to receive a call set-up burst transmitted by a terminal in the same timeslot of a reverse transmission direction as in which the transceiver serving the outer service area transmits information concerning the base station.

6. The base station as claimed in claim 3, wherein the transceiver serving the inner service area is adapted to transmit to the plurality of terminals so that a timeslot corresponding to the predetermined timeslot and the following timeslot are not used for communication with a terminal.

7. The base station as claimed in claim 3, wherein the transceiver serving the outer service area is adapted to transmit to the plurality of terminals so that the last timeslot of a frame is not used for communication with a terminal.

8. A data transmission method for a TDMA radio system, the method comprising:
   a plurality of base stations communicating with a plurality of terminals within their area;
   at least two transceivers being used in the plurality of base stations to form at least two service areas, the at least two service areas being at least partly different to form an inner service area and an outer service area, wherein each transceiver serves one service area; and
   the base station transmitting information concerning itself to the plurality of terminals, wherein only the transceiver serving the outer service area transmits information concerning the base station to the plurality of terminals.

9. The method as claimed in claim 8, wherein the timing of the reception of the transceiver serving the outer service area is delayed in order to compensate for the effect of the propagation delay.

10. The method as claimed in claim 8, wherein the transceiver serving the outer service area transmits information concerning the base station in a predetermined timeslot.

11. The method as claimed in claim 10, wherein the transceiver serving the outer service area receives a call set-up burst transmitted by a terminal in the same timeslot of the reverse transmission direction as in which information concerning the base station is transmitted.

12. The method as claimed in claim 10, wherein the transceiver serving the inner service area receives a call set-up burst transmitted by a terminal in the same timeslot of the reverse transmission direction as in which the transceiver serving the outer service area transmits information concerning the base station.

13. A method as claimed in claim 10, wherein the transceiver serving the outer service area transmits to the terminals so that the last timeslot of a frame is not used for communication with a terminal.

* * * * *